US005855067A

United States Patent [19]

Taomo et al.

[11] Patent Number: 5,855,067

[45] Date of Patent: Jan. 5, 1999

[54] MODULAR PORTABLE POWER TOOL

[75] Inventors: Toshio Taomo; Wang Yan Song, both of Tokyo, Japan

[73] Assignee: Kioritz Corporation, Tokyo, Japan

[21] Appl. No.: 760,053

[22] Filed: Dec. 4, 1996

[30] Foreign Application Priority Data

Dec. 8, 1995 [JP] Japan .................................... 7-320705

[51] Int. Cl.[6] .............................. B25F 5/00; B27B 17/10; B23D 57/02

[52] U.S. Cl. ................................ 30/122; 30/383; 474/158

[58] Field of Search ............................ 30/122, 381, 383; 83/374; 474/159, 84, 158, 160, 171; 74/664, 665 GE

[56] References Cited

U.S. PATENT DOCUMENTS 3,519,037 7/1970 Linkfield ................................ 474/158
3,834,183 9/1974 Müller ........................................ 64/15
4,615,117 10/1986 Flath ......................................... 30/122
5,014,835 5/1991 Nagshima et al. ..................... 192/48.5

FOREIGN PATENT DOCUMENTS

4011058A1 10/1990 Germany .

*Primary Examiner*—Douglas D. Watts
*Attorney, Agent, or Firm*—Baker & Botts, L.L.P.

[57] ABSTRACT

A portable power tool includes a power module and a tool module, e.g., a chain saw module which is attached to the power module and which can be readily exchanged with another tool module, e.g., a cutter module. The power module includes a power source such as two-stroke gasoline engine with a drive shaft. To facilitate rapid exchange of tool modules, there are two or more torque transmission members such as a pulley and a sprocket wheel on the drive shaft, so that different tool modules can be attached to the power module without removal and replacement of the torque transmission member.

8 Claims, 5 Drawing Sheets

MODULAR PORTABLE POWER TOOL

TECHNICAL FIELD

The present invention relates to a portable power tool which can be adapted for different functions.

BACKGROUND OF THE INVENTION

A portable power tool can be adaptable, e.g., for use as a disk cutter or a chain saw. A power source such as a small-scale air-cooled two-stroke gasoline engine or an electrical motor or the like is disposed in a power unit of the power tool. Typically, the power unit has a handle and the like which can serve equally for either adaptation, e.g., whether a disk cutter or a chain saw assembly is attached to the power unit. But there are differences in the way power is transmitted from the power unit to different tool assemblies: in the case of an attached disk cutter assembly, power is transmitted typically by a pulley and belt drive; in the case of a chain saw, by a sprocket wheel directly to the saw chain.

Conventionally, to change the function of such a power tool from cutting to sawing for example, a cutter assembly including a cutting disk or blade, a protective blade cover, and a supporting arm and the like is removed from the power unit. Then the pulley is removed from the power output or drive shaft of the power source, a sprocket wheel is put in place, and a chain saw assembly is attached to the power unit. Changing back to cutting involves a corresponding inverse procedure.

These procedures are cumbersome and time consuming especially when, as is typical, a centrifugal clutch is included for transmission of power from the drive shaft. The drawbacks are serious especially in an emergency, e.g., in rescuing an earthquake victim trapped under a house.

SUMMARY OF THE INVENTION

It is an object of the invention to provide a portable power tool having a power module including a power source, to which different functional or tool modules can be attached more efficiently. Disposed on the drive shaft of the power source of a preferred embodiment are two or more torque transmission members, for power transmission to one or another of different tool modules such as a disk cutter or a chain saw. As a result, in changing from one tool function to another, it is no longer necessary to remove a torque transmission member from the drive shaft and to replace it with another.

The torque transmission members, e.g., a pulley and a sprocket wheel can be combined into a unit, and they can be so combined further with a centrifugal clutch.

DETAILED DESCRIPTION

Figure 1:
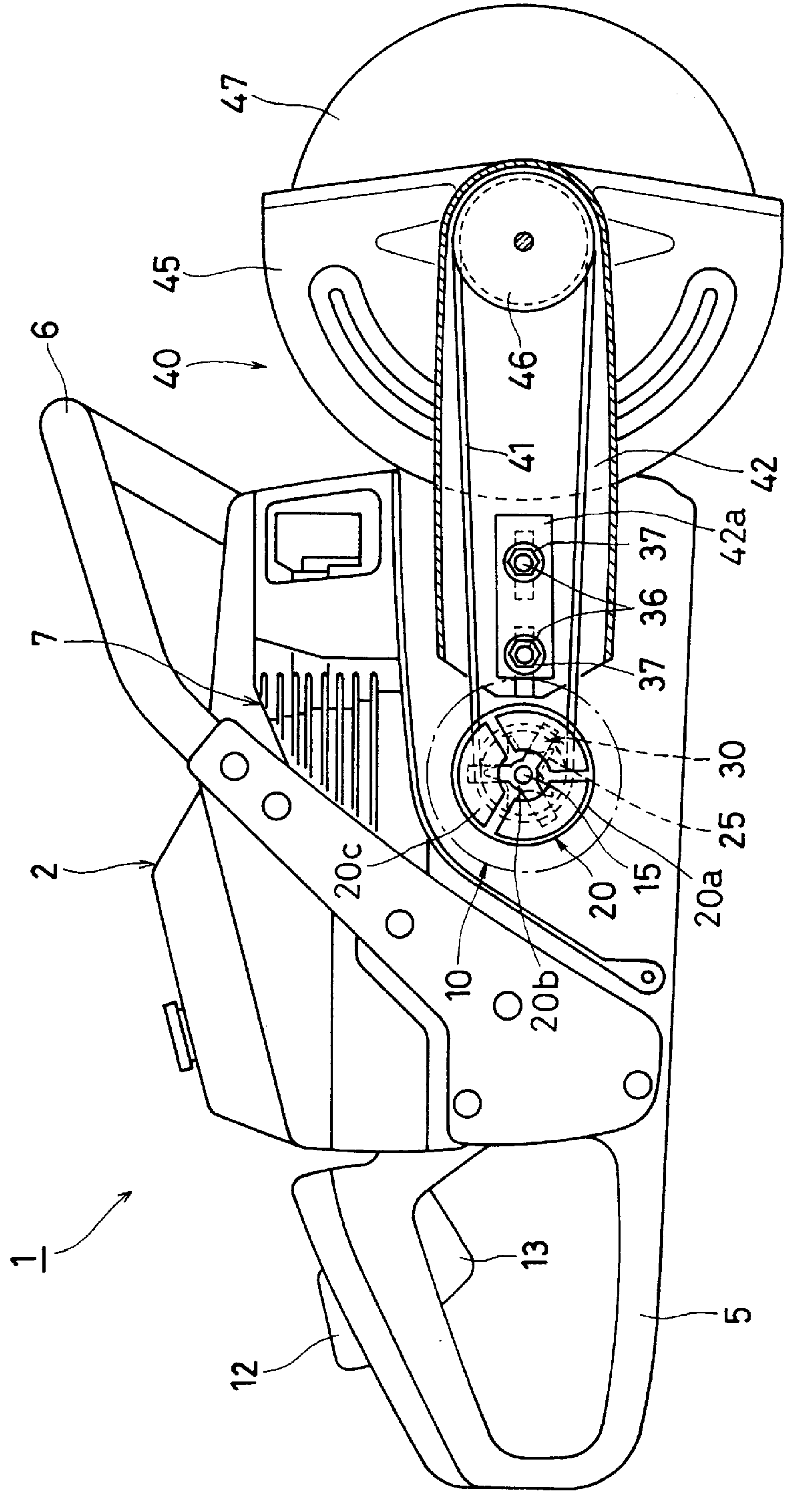
FIG. 1 is a schematic side view of a power cutter with its protective cover removed, including a power module in accordance with a preferred embodiment of the invention.
Figure 2:
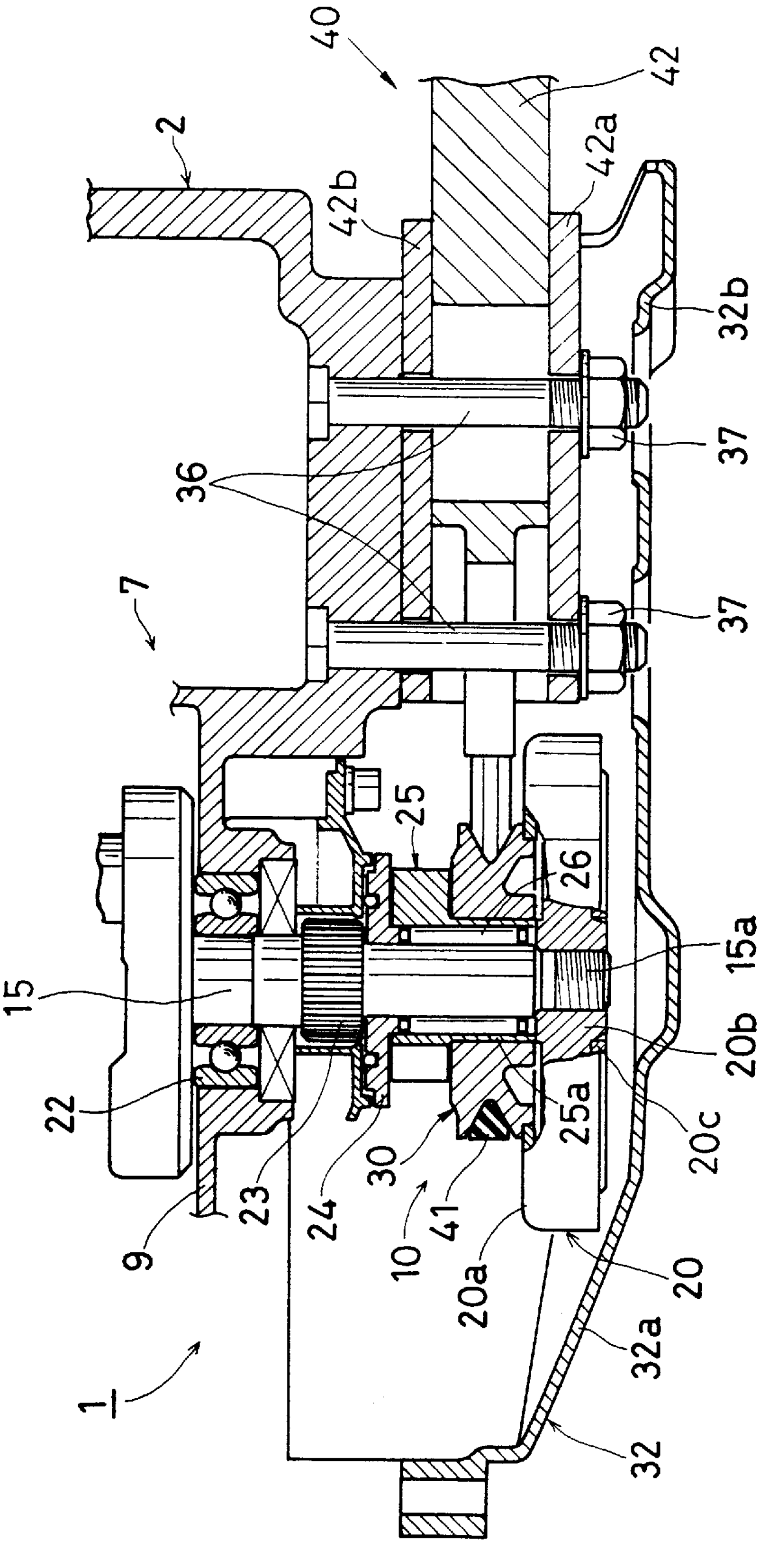
FIG. 2 is a schematic horizontal cross section of a portion of the power cutter of FIG. 1 on a larger scale.

The power cutter shown in FIGS. 1 and 2 has a power module 2 with a small-scale air-cooled two-stroke gasoline engine 7 which is substantially centrally disposed in the power module 2. At its rear, the power module 2 has a rear handle 5 with a throttle trigger 13 and a locking safety lever 12 for the trigger 13. The throttle trigger 13 is operable only when the locking safety lever 12 is depressed. A forward handle 6 extends from the lower middle to the upper front of the power module 2.

Figure 5:
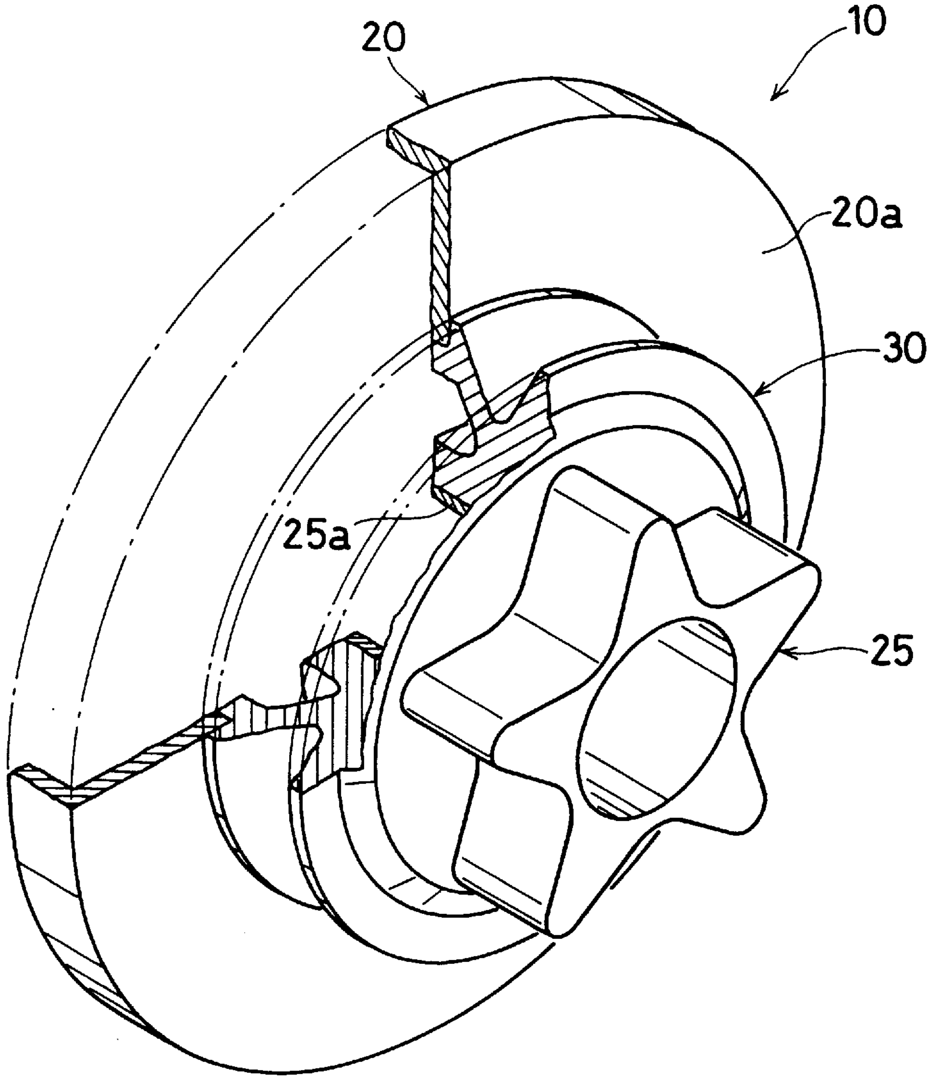
FIG. 5 is a partially cut away perspective of a unitary torque transmission element for the power module in FIGS. 1–4.

In a crankcase 9 of the engine 7, a bearing 22 supports a crankshaft 15. A gear 23 for driving an oil pump (not shown) and an adjacent thrust plate 24 are attached to the crankshaft 15 at a base portion of the drive end of the crankshaft 15. A needle bearing 26 is mounted on the crankshaft 15 beyond the thrust plate 24, and a torque transmission assembly 10 as shown in further detail in FIG. 5 is rotatably disposed on the needle bearing 26.

The torque transmission assembly 10 includes a star-shaped sprocket wheel 25, a V-belt pulley 30 secured on an extending sleeve portion 25*a* of the sprocket wheel 25, and a centrifugal clutch 20. Secured to a clutch drum 20*a* of the centrifugal clutch 20 is that side portion of the drive pulley 30 which faces away from the sprocket wheel 25. The sprocket wheel 25, the drive pulley 30 and the clutch drum 20*a* are constructed so as to rotate as a unit. A mounting boss portion 20*b* for a centrifugal shoes 20*c* of the centrifugal clutch 20 is screwed and secured on a male screw end portion 15*a* of the crankshaft 15.

Figure 3:
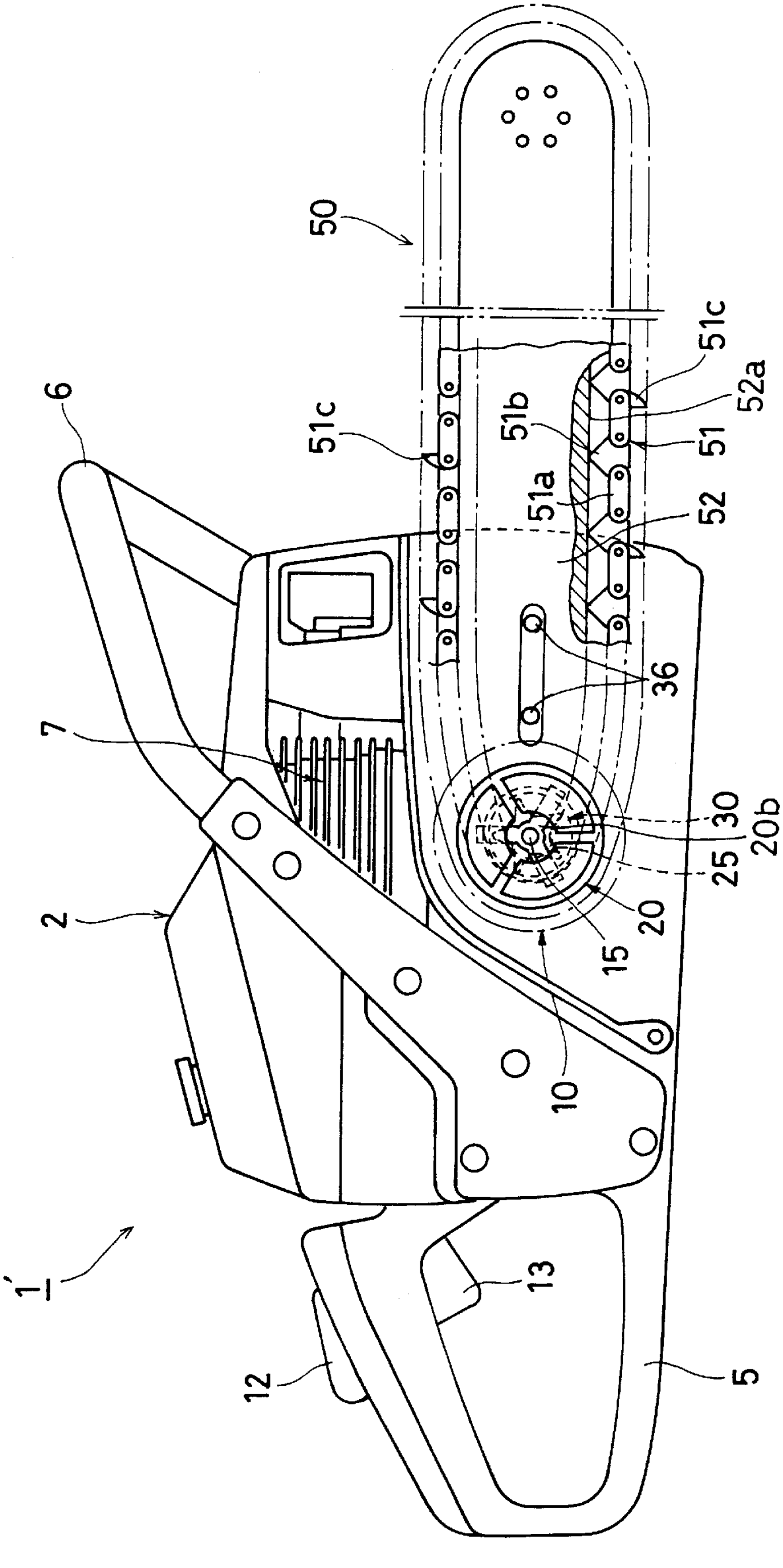
FIG. 3 is a schematic side view of a chain saw with its protective cover removed, including a power module as in FIG. 1.
Figure 4:
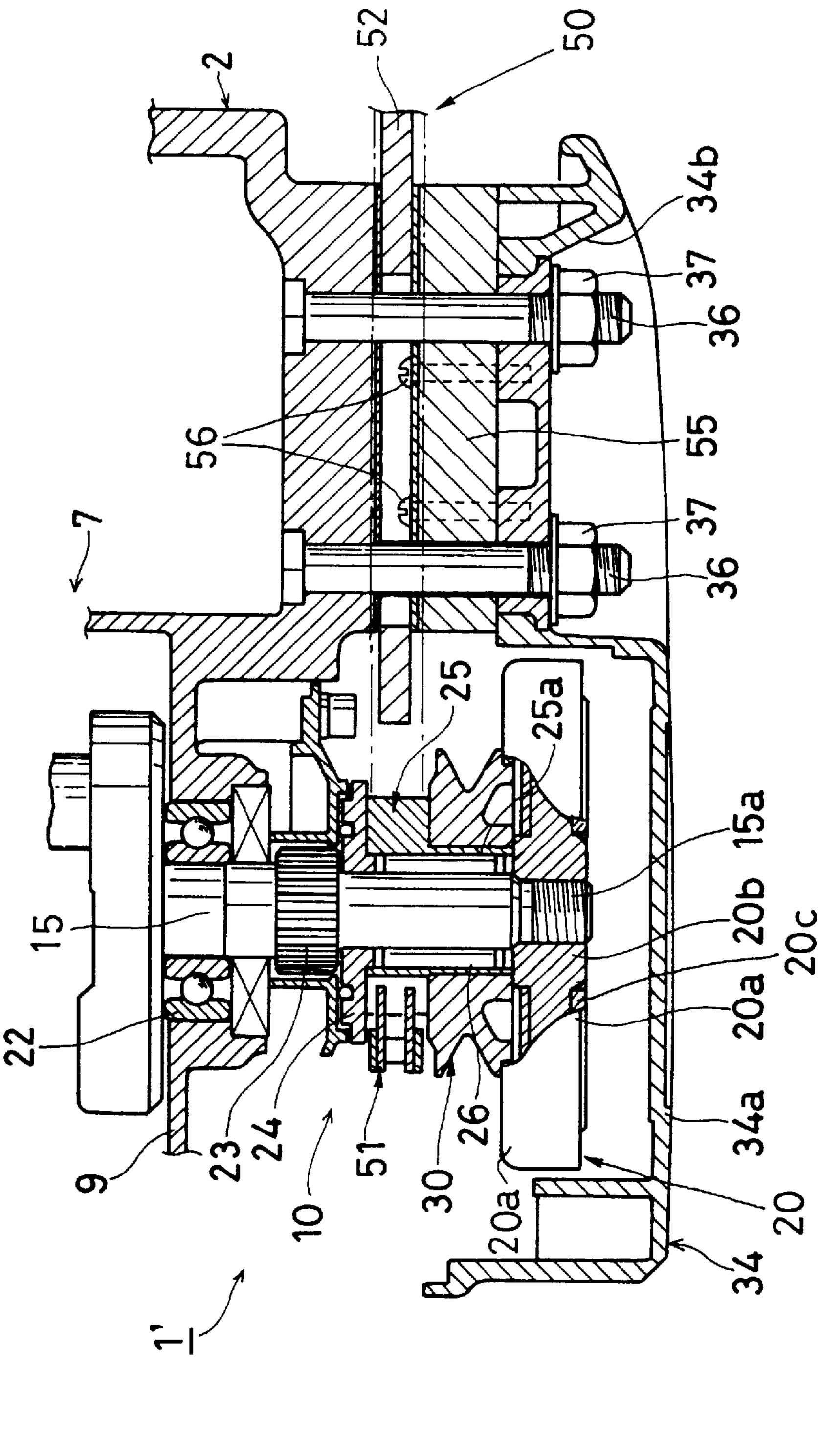
FIG. 4 is a schematic horizontal cross section of a portion of the chain saw of FIG. 3 on a larger scale

The power module 2 can be used with a cutter module 40 as shown in FIGS. 1 and 2 or a chain saw module 50 as shown in FIGS. 3 and 4. The cutter module 40 has a protective cover 32 on the power output side of the power module 2, with a rear portion 32*a* covering the torque transmission assembly 10, and a forward portion 32*b* covering a mounting base portion.

The cutter module 40 further includes a box-shaped support arm 42, a blade cover 45 attached to the front end of the support arm 42, a round cutter blade 47 whose rear half is protected by the blade cover 45, a V-belt follower pulley 46 which is attached to the cutter disk 47, and a V-belt 41 over the two pulleys 30 and 46. The diameter of the follower pulley 46 is larger than the diameter of the drive pulley 30. The rear portion of the support arm 42 are detachably mounted to the power module 2, fastened by the two stud bolts 36 on the power module 2 and the nuts 37 through the back plates 42*a* and 42*b* which also serve as spacers. Such a cutter module 40 is also described in Japanese Utility Model Publication No. Heisei 5-18084, for example.

In a chain saw 1' as shown in FIGS. 3 and 4, the power module 2, the engine 7, the forward and rear handles 6 and 5, the stud bolts 36, and the nuts 37 are as in FIGS. 1 and 2. But, instead of the cutter module 40 with the cover 32, a chain saw module 50 with protective cover 34 is attached to the power module 2. The rear portion 34*a* of the cover 34 protects the torque transmission assembly 10, and the forward portion 34*b* protects the rear portion of the saw chain 51.

The chain saw module 50 is conventional and has a guide bar 52 with a supporting channel 52*a* at its outer periphery, and a saw chain 51 with elongated tie link members 51*a*, and drive link members 51*b* with triangular claws which engage with the sprocket wheel 25. The link members are connected to each other with pins, and blade portions 51*c* project from the outer periphery of the tie link members 51*a*. The saw chain 51 is wrapped between the sprocket wheel 25 and the guide bar 52 so as to turn and move along the outer periphery of the guide bar 52.

Mounted in the forward portion 34*b* of the cover 34 is a spacer 55 with screws 56. The spacer 55 of the cover 34 and the rear portion of the guide bar 52 are detachably mounted to the power module 2 so as to be fastened by the two stud bolts 36 on the power module 2, and the nuts 37.

A power tool with power module 2 including a unitary torque transmission assembly 10 consisting of the drive pulley 30, the sprocket wheel 25 and the centrifugal clutch 20, permits ready change-over from cutter function to saw function as follows: the cutter module 40 including the protective cover 32, the cutter blade 47, the blade cover 45, and the support arm 42 are removed as a unit from the power module 2, and the V-belt 41 is detached from the drive pulley 30. The chain saw module 50 including the saw chain 51 and the guide bar 52 is attached to the power module 2, and the saw chain 51 is wrapped onto the sprocket wheel 25. There is no need to remove a pulley from the crankshaft of the engine and to replace it with a sprocket wheel. Thus, change-over is expedited, which is particularly important in emergency situations. An inverse procedure applies for changeover back to the cutter tool.

The claimed invention includes embodiments and variants in addition to those described above. For example, more than one pulley and/or more than one sprocket wheel can be included, and pulleys and sprocket wheels can have different sizes and shapes. Also, tool modules other than a cutter disk module and a saw chain module can be provided for.

We claim:

1. A power module for attachment thereto of at least one of a first tool module and a second tool module to form a power tool, comprising:

a power source having a drive shaft;

a first torque transmission member for transmitting torque to the first tool module when the first tool module is attached to the power module said first torque transmission member having a first axis of rotation and a first radius defined by the distance of a perpendicular line from said first axis of rotation to said furthest outer boundary of said first torque transmission member;

a second torque transmission member for transmitting torque to the second tool module when the second tool module is attached to the power module, said second torque transmission member having a second axis of rotation and a second radius defined by the distance of a perpendicular line from said second axis of rotation to said furthest outer boundary of said second torque transmission member;

a first clutch element having a third axis of rotation, said first and second torque transmission members being drivably carried by said first clutch element and being arranged concentrically outward along said third axis of rotation in the order of said first radius and said second radius, such that said first torque transmission member is placed closer to said first clutch element if said first radius is larger than said second radius and said second torque transmission member is placed closer to said first clutch element if said second radius is larger than said first radius; and a second clutch element drivably carried by said drive shaft and engagable with said first clutch element for, when so engaged, transmitting torque from the drive shaft to the first and second torque transmission members.

2. The power module of claim 1, wherein said first tool module comprises a disk cutter and said second tool module comprises a chain saw.

3. The power module of claim 1, wherein the first torque transmission member comprises a pulley and said second torque transmission member comprises a sprocket wheel.

4. The power module of claim 1, wherein said first and second clutch elements form a centrifugal clutch.

5. A power module for attachment thereto of at least one of a first tool module and a second tool module to form a power tool, comprising:

a power source having a drive shaft;

a first torque transmission member for transmitting torque to the first tool module when the first tool module is attached to the power module said first torque transmission member having a first axis of rotation and a first radius defined by the distance of a perpendicular line from said first axis of rotation to said furthest outer boundary of said first torque transmission member;

a second torque transmission member for transmitting torque to the second tool module when the second tool module is attached to the power module, said second torque transmission member having a second axis of rotation and a second radius defined by the distance of a perpendicular line from said second axis of rotation to said furthest outer boundary of said second torque transmission member;

a first clutch element having a third axis of rotation, said first and second torque transmission members being drivably carried by said first clutch element and being arranged concentrically outward along said third axis of rotation in the order of said first radius and said second radius, such that said first torque transmission member is placed closer to said first clutch element if said first radius is larger than said second radius and said second torque transmission member is placed closer to said first clutch element if said second radius is larger than said first radius; and a second clutch element drivably carried by said drive shaft and engagable with said first clutch element for, when so engaged, transmitting torque from the drive shaft to the first and second torque transmission members; and at least one of the first and second tool modules attached and operationally coupled to the power module.

6. The power module of claim 5, wherein said first tool module comprises a disk cutter and said second tool module comprises a chain saw.

7. The power module of claim 5, wherein the first torque transmission member comprises a pulley and said second torque transmission member comprises a sprocket wheel.

8. The power module of claim 5, wherein said first and second clutch elements form a centrifugal clutch.

* * * * *